United States Patent Office

3,786,040
Patented Jan. 15, 1974

3,786,040
PHENYL- OR NAPHTHYL AZO SULFONAMIDO-PYRAZOLE DYES
Roland Mislin, Saint-Louis, France, and Hanspeter Uehlinger, Basel, Switzerland, assignors to Sandoz Ltd., Basel, Switzerland
No Drawing. Continuation-in-part of abandoned application Ser. No. 821,502, May 2, 1969. This application May 11, 1971, Ser. No. 142,403
Claims priority, application Switzerland, May 13, 1968, 7,088/68
Int. Cl. C09b 29/38; D06p 3/24
U.S. Cl. 260—162          10 Claims

ABSTRACT OF THE DISCLOSURE

Azo dyes of the formula

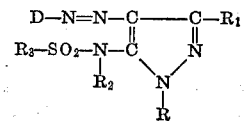

wherein
D is the radical of a phenyl or naphthyl diazo component,
R is hydrogen, carboxyl, acyl, hydrocarbyl or substituted hydrocarbyl,
$R_1$ is hydrogen, carboxylic acid ester, carboxylic acid amide or substituted or unsubstituted alkyl, cycloalkyl, alkoxy or aryl,
$R_2$ is hydrogen, acyl, hydrocarbyl or substituted hydrocarbyl, and
$R_3$ is hydrocarbyl or substituted hydrocarbyl, with the proviso that the molecule contains between 1 and 4 sulfo groups, preferably 1 or 2 sulfo groups. These dyes of yellow to orange shade are useful for natural and synthetic polyamide fibres. They exhibit excellent light fastness and perspiration fastness.

---

This is a continuation-in-part of application Ser. No. 821,502, filed May 2, 1969, by Roland Mislin et al. and now abandoned.

The present invention relates to and has as its objects new and useful azo dyes of the formula

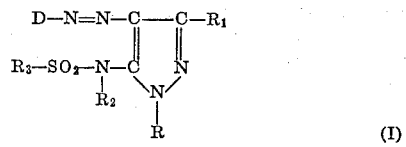

wherein
D is the radical of a diazo component free from metallizable groups;
R is hydrogen, acyl, hydrocarbon or substituted hydrocarbon;
$R_1$ is hydrogen, carboxyl, carboxylic acid ester, carboxylic acid amide, or substituted or unsubstituted alkyl, cycloalkyl, alkoxy or aryl;
$R_2$ is hydrogen, acyl or substituted or unsubstituted hydrocarbon; and
$R_3$ is substituted or unsubstituted hydrocarbon, and where further at least one sulfo group is present in the diazo and/or coupling component.

More particularly the new azo dyes consist of a diazo component and a coupling component as shown in Formula I, the diazo component having an aromatic nucleus, an aromatic ring carbon of which is directly bound to one nitrogen atom of the —N=N— group, the other nitrogen of said group being directly bound to the available bond of the coupling component, the aromatic nucleus being at most bicyclic, having at least one aromatic ring and containing at most 10 ring carbon atoms, both positions ortho to the ring carbon in said diazo component that is directly bound to the one nitrogen atom being free from metallizable groups and said coupling component being of the formula:

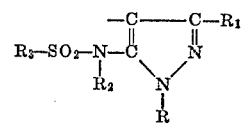

wherein
R is hydrogen, acyl, hydrocarbon or substituted hydrocarbon;
$R_1$ is hydrogen, carboxyl, (benzoyloxy),

—CO—N($R_5$)$R_6$, —COO—$R_7$ substituted or unsubstituted lower alkyl, substituted or unsubstituted cycloalkyl having from 4 to 7 ring carbon atoms, substituted or unsubstituted lower alkoxy or substituted or unsubstituted carbocyclic aryl which is at most bicyclic and each ring of which has 6 ring members, any substituent on a substituted member being lower alkyl, lower alkoxy, halo, nitro, cyano, amino, carboxyl, phenyl or halophenyl;
$R_2$ is hydrogen, acyl, hydrocarbon or substituted hydrocarbon;
each of $R_3$ and $R_7$ is, independently, hydrocarbon or substituted hydrocarbon, any substituent of which is halo, hydroxy, cyano, phenyl or lower alkyl;
each of $R_5$ and $R_6$ is, independently, hydrogen or one of the meanings of $R_3$;
each hydrocarbon being lower alkyl, phenyl, naphthyl or cycloalkyl having from 4 to 7 carbon atoms; any substituent of a substituted lower alkyl, lower alkoxy or cycloalkyl being halo, hydroxy, cyano, phenyl or lower alkyl, unless otherwise defined; any substituent on a substituted aromatic hydrocarbon being halo, cyano, nitro, hydroxy, trihalo(lower)alkyl, lower alkyl, substituted lower alkyl, cycloalkyl having from 4 to 7 carbon atoms, phenyl, naphthyl, lower alkoxy, phenoxy, naphthyloxy, carb(lower)alkoxy, acylamino, sulfamido, (lower)alkylsulfonyl, substituted (lower) alkylsulfonyl, phenylsulfony, carboxyic acid (lower) alkyl ester, carboxylic acid phenyl ester, sulfonic acid (lower)alkyl ester, sulfonic acid phenyl ester, carboxylic acid amido or sulfonic acid(sulfo), unless otherwise defined; each halo being chloro, bromo, fluoro or iodo; and each acyl being of one of the formulae: $R_{10}$—$X_1$ and $R_{11}$—$X_2$, wherein
$R_{10}$ is hydroxy or one of the meanings of $R_3$;
$R_{11}$ is one of the meanings of $R_5$;

$X_1$ is —O—CO— or —SO$_2$—;
$X_2$ is —CO—, —N(R$_{12}$)—CO— or
—N(R$_{12}$)—SO$_2$—
and
R$_{12}$ is one of the meanings of R$_5$, and wherein the molecule contains from 1 to 4 and preferably not more than 2 sulfonic acid groups.

The diazo component D of Formula I more particularly is a benzene or naphthalene nucleus which is substituted or unsubstituted, and any substituent on a substituted nucleus is halo, lower alkyl, lower alkoxy, phenoxy, substituted phenoxy, nitro, (lower)alkylphenylsulfone, cycloalkyl having from 4 to 7 carbon atoms, sulfonic acid (dilower alkylsulfamoyl), sulfonic acid hydroxy(lower) alkylamide (lower hydroxyalkylsulfamoyl) hydroxy, hydroxyphenyl, halophenyl, sulfonic acid (lower) alkylamide (lower)alkylsulfamoyl, (lower)alkylcarbonylamino, sulfonic acid N-(lower)alkyl-N-phenylamide, sulfonic acid amide (sulfamoyl), sulfonic acid phenylamide, benzoylamino(benzamido), sulfonic acid(sulfo), phenylazo, diphenylazo or naphthylazo; each halo being chloro, bromo, fluoro or iodo.

Whenever in the foregoing the term alkyl radical has been used and not otherwise been explained, those alkyl radicals may be straight or branched alkyl radicals; they generally contain 1 to 12 or 1 to 6 or preferably 1, 2, 3 or 4 carbon atoms. If these radicals are substituted they contain in particular halogen atoms, hydroxy or cyano groups or aryl radicals, in which last mentioned case substituted alkyl includes of course an aralkyl radical, e.g. a benzyl radical.

Whenever the term alkoxy radical has been used and not otherwise been explained, these alkoxy radicals may contain 1 to 6 or preferably 1, 2 or 3 carbon atoms.

Preferred azo dyes according to Formula I are those wherein the aromatic nucleus D of the diazo component is a substituted or unsubstituted benzene or naphthalene nucleus, the substituents being preferably a sulfonic acid group, chloro atoms or an optionally substituted phenoxy group, R is phenyl or substituted phenyl, R$_1$ is substituted or unsubstituted lower alkyl and R$_3$ is phenyl or substituted phenyl; still more preferred azo dyes are those wherein R is sulfophenyl, i.e. where one of the sulfonic acid groups of the whole molecule is in this group and where further possible substituents alone, or in combination with the sulfonic acid group, are chloro; R$_1$ is methyl and R$_3$ is substituted phenyl, one substituent of which is lower alkyl, preferably methyl.

More particularly, the preferred compounds of this invention are the compounds of Formula I wherein D is phenyl, substituted phenyl, naphthyl or substituted naphthyl, wherein each substituent of substituted phenyl and substituted naphthyl is independently chloro, sulfo, phenoxy or substituted phenoxy wherein the substituent of substituted phenoxy is chloro or cyclohexyl.
R is phenyl or substituted phenyl wherein each substituent is independently lower alkyl, halo, nitro, sulfamoyl, lower alkoxy or sulfo,
R$_1$ is lower alkyl,
R$_2$ is hydrogen, and
R$_3$ is phenyl or lower alkylphenyl, and especially the compounds of this group wherein D is sulfonaphthyl or substituted phenyl wherein each substituent is independently chloro, sulfo or chlorophenoxy,
R is phenyl or substituted phenyl wherein each substituent is independently chloro or sulfo,
R$_1$ is methyl, and
R$_3$ is lower alkylphenyl (preferably p-tolyl).

The following compounds are particularly good azo dyes according to this invention.

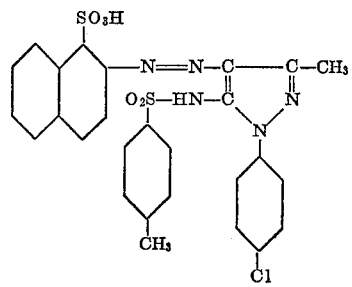

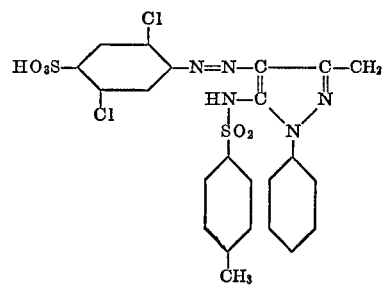

More particularly this invention relates to the compounds of Formula I wherein

D is phenyl, substituted phenyl, naphthyl or substituted naphthyl, wherein each substituent of substituted phenyl and substituted naphthyl is independently halo, lower alkyl, phenoxy, substituted phenoxy wherein each substituent is independently chloro, hydroxy or cyclohexyl, nitro, cyclohexyl, lower alkylphenylsulfonyl, sulfamoyl, lower alkylsulfamoyl, lower hydroxyalkylsulfamoyl, phenylsulfamoyl, dilower alkylsulfamoyl, N-lower alkyl-N-phenylsulfamoyl, lower alkylcarbonylamino, benzamido, sulfo, phenylazo, diphenylazo or naphthylazo,
R is hydrogen, lower alkyl, substituted lower alkyl wherein each substituent is independently halo, hydroxy, cyano or phenyl, phenyl, substituted phenyl, naphthyl, substituted naphthyl, cycloalkyl or 4 to 7 carbon atoms, substituted cycloalkyl wherein each substituent is independently halo, hydroxy, cyano, phenyl or lower alkyl and the cycloalkyl ring has 4 to 7 carbon atoms or acyl,
R$_1$ is hydrogen, carboxy, benzoyloxy, —CONR$_5$R$_6$, —CO$_2$R$_7$, lower alkyl, substituted lower alkyl wherein each substituent is independent lower alkoxy, halo, nitro, cyano, amino, carboxy or halophenyl, cycloalkyl of 4 to 7 carbon atoms, substituted cycloalkyl wherein each substituent is independently lower alkyl, lower alkoxy, halo, nitro, cyano, amino, carboxy, phenyl or halophenyl and the cycloalkyl ring of substituted cycloalkyl has 4 to 7 carbon atoms, lower alkoxy, phenyl, naphthyl, substituted phenyl or substituted naphthyl, wherein each substituent of substituted phenyl and substituted naphthyl is independently lower alkyl, lower alkoxy, halo, nitro, cyano, amino, carboxy, phenyl or halophenyl,
R$_2$ is hydrogen, lower alkyl, substituted lower alkyl wherein each substituent is independently halo, hydroxy, cyano or phenyl, cycloalkyl of 4 to 7 carbon atoms, substituted cycloalkyl wherein each substituent is independently halo, hydroxy, cyano, phenyl or lower alkyl and the cycloalkyl ring of substituted cycloalkyl has 4 to 7 carbon atoms, phenyl, substituted phenyl, naphthyl, substituted naphthyl or acyl, each of $R_3$ and $R_7$ is independently lower alkyl, substituted lower alkyl wherein each substituent is independently halo, hydroxy, cyano or phenyl, cycloalkyl of 4 to 7 carbon atoms, substituted cycloalkyl wherein each substituent is independently halo, hydroxy, cyano, phenyl or lower alkyl and the cycloalkyl ring has 4 to 7 carbon atoms, phenyl, naphthyl, substituted phenyl or substituted naphthyl, wherein each substituent of substituted phenyl and the substituted naphthyl is independently halo, hydroxy, cyano, phenyl or lower alkyl, and each of $R_5$ and $R_6$ is independently hydrogen or $R_3$.

wherein in each of R and $R_2$ each substituent of substituted phenyl and substituted napthyl is independently halo, cyano, nitro, hydroxy, lower alkyl, substituted lower alkyl wherein each substituent of substituted lower alkyl is independently halo, hydroxy, cyano or phenyl, cycloalkyl of 4 to 7 carbon atoms, phenyl, naphthyl, lower alkoxy, phenoxy, naphthyloxy, lower carboxyalkyl, acylamino, sulfamoyl, lower alkylsulfonyl, substituted lower alkylsulfonyl wherein each substituent is independently halo, hydroxy, cyano or phenyl, phenylsulfonyl, lower alkoxycarbonyl, phenoxycarbonyl, lower alkoxysulfonyl, phenoxysulfonyl, carbamoyl or sulfo, and each acyl and acyl radical of acylamino is independently $R_{10}-X_1-$ or $R_5X_2-$, wherein
$R_{10}$ is hydroxy or $R_3$,
$X_1$ is

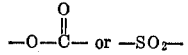

$X_2$ is

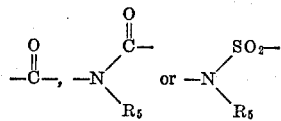

and
$R_3$ and $R_5$ are as defined above.

with the proviso that the molecule contains 1 or 2 sulfo groups, and particularly to the compounds of this group wherein D is phenyl, substituted phenyl, naphthyl or substituted naphthyl, wherein each substituent of substituted phenyl and substituted naphthyl is independently halo, lower alkyl, phenoxy, substituted phenoxy wherein each substituent is independently chloro, hydroxy or cyclohexyl, nitro, lower alkylphenylsulfonyl, sulfamoyl, lower alkylsulfamoyl, lower hydroxyalkylsulfamoyl, phenylsulfamoyl, dilower alkylsulfamoyl, N-lower alkyl-N-phenylsulfamoyl, lower alkylcarbonylamine, benzamido or sulfo, R is hydrogen, lower alkyl, phenyl, substituted phenyl wherein each substituent is independently lower alkyl, halo, nitro, sulfamoyl, lower alkoxy or sulfo, carbamoyl, phenylcarbamoyl or lower alkylcarbonyl, $R_1$ is hydrogen, lower alkyl, substituted lower alkyl wherein each substituent is independently cyano, carboxy or halophenyl, lower alkoxy, phenyl, substituted phenyl wherein each substituent is independently lower alkyl, lower alkoxy, nitro, amino or halo, benzoyloxy, carboxy or lower alkoxycarbonyl, $R_2$ is hydrogen, lower alkyl, phenyl or p-aminophenylsulfonyl, and $R_3$ is lower alkyl, phenyl or lower alkylphenyl.

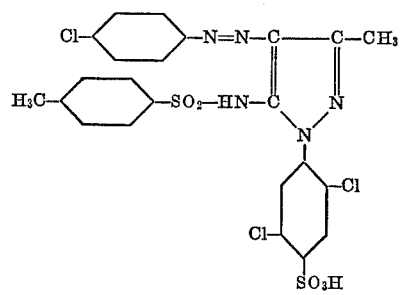

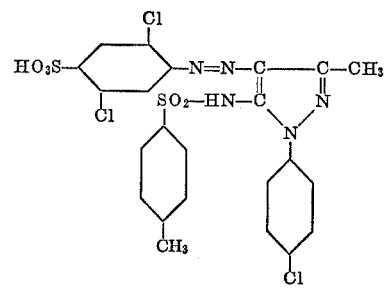

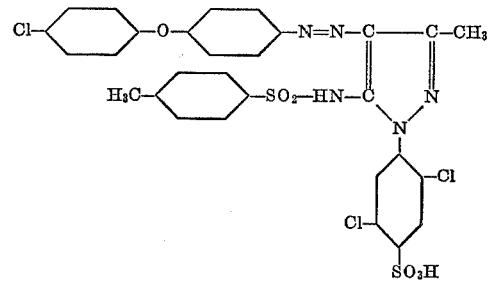

The dyes of the above Formula I can be produced by coupling a diazo component of an amine of the formula $$D-NH_2 \quad (II)$$

with a coupling component of the formula

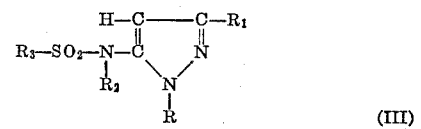

(III)

A number of dyes of the Formula I can be arrived at by reacting a compound of formula

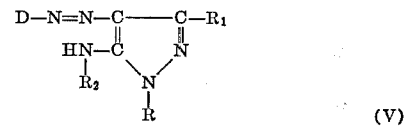

(V)

with a compound of the formula $$R_3-SO_2-X \quad (VI)$$

where X represents halogen, preferably chlorine.

Intermediary compounds of Formula III can be obtained by cyclizing a compound of the formula

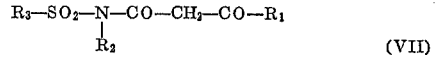

(VII)

with a hydrazine of the formula $R-NH-NH_2$.

The coupling reaction is known in principle and can be effected by the methods known to every dye chemist skilled in the art. It is of advantage to employ an acid medium of pH 3–6.

The new dyes are used for exhaustion dyeing, pad dyeing and printing of leather and of fibres and textiles which consist of or which contain natural or synthetic polyamides and basic modified polypropylene fibres.

The dyes are normally applied from neutral to acid medium at pH 2-7 or preferably pH 4-5 in the presence of an acid, e.g. an organic acid, such as acetic or formic acid. The dyeings obtained have good light and wet fastness properties, including washing, perspiration, acid, alkali, sea water and milling fastness, and are fast to rubbing. The dyes are well soluble in water, dye very level and cover barry nylon. They can be applied in combination with each other or with other acid dyes, e.g. anthraquinone dyes, to give dyeings with similarly good light and wet fastness.

The main natural polyamides are wool and silk. The principal synthetic polyamides are polycondensation products of dibasic organic acids, e.g. adipic or sebacic acid, and hexamethylene diamine, or of ω-aminoundecyclic acid or poly-ε-caprolactam.

German Pat. 705,780 describes azo dyes of the formula

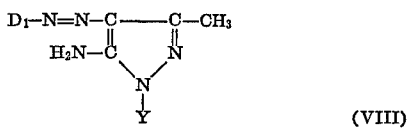

(VIII)

where $D_1$ represents the radical of a benzolic diazo component and Y an aryl. Dyes of this type are employed for dyeing natural polyamides.

These dyes, however, have poor wet fastness properties both on natural and synthetic polyamides. The dyes of Formula I in contrast thereto have clearly superior water and perspiration fastness on these substrates. Moreover, the dyes of Formula VIII, applied to these substrates in combination with other anionic dyes, preferably anionic anthraquinone dyes, give dyeings of poor light fastness. Applied to the same substrates in combination with other anionic dyes, e.g. anthraquinone dyes, the dyes of Formula I have considerably higher light fastness.

Swiss Pat. 353,103 describes azo dyes of the inventive type with metallizable groups—especially hydroxy groups—in the radical D of Formula I said metallizable groups being in ortho position to the —N=N— group. These azo dyes are used as their metal complex especially chromium complex. When used in the metal-free form, the azo dyes of Swiss Pat. 353,103 exhibit a far lesser light stability than the inventive azo dyes having no metallizable group in the ortho position to the —N=N— group.

In the following examples the parts and percentages are by weight and the temperatures in degrees centigrade.

EXAMPLE 1

12.7 parts of 1-amino-4-chlorobenzene are diazotized in the normal way with a sodium nitrite solution and the diazo compound is coupled with 41 parts of 1-para-sulfophenyl-3-methyl-5-para-toluenesulfonamidopyrazole in solution in 200 parts of water and 23 parts of 30% sodium hydroxide solution at a temperature of 5-8°. Subsequently the pH of the solution is adjusted to 7 and the dye, which settles out is filtered off with suction, washed and dried. This dyes gives bright, level yellow dyeings of good light and wet fastness on natural and synthetic polyamide fibres.

Dyes showing equally good properties are obtained when the 12.7 parts of 1-amino-4-chlorobenzene are replaced by the equivalent amount of one of the following components:

1-amino-2- or -3-chlorobenzene,
1-amino-2-, -3- or -4-methylbenzene,
1-aminobenzene,
1-amino-3- or -4-methoxybenzene,
4-amino-1,1'-diphenylether,
4-amino-4'-chloro-1,1'-diphenylether,
1-amino-2,5-dichlorobenzene,
1-amino-4-butoxybenzene,
1-amino-2-methyl-5-chlorobenzene,
1-amino-2-chloro-4-nitrobenzene,
1-amino-5-chlorophenyl-2-p-tolylsulfone,
4-amino-4'-cyclohexyl-1,1'-diphenylether,
1-amino-2- or -4-nitrobenzene,
meta-thionanisidine,
1-amino-4-methyl-3-nitrobenzene,
1-amino-4-methyl-2-nitrobenzene,
2-amino-1-methylbenzene-4-sulfonic acid dimethylamide,
4-amino-1-methylbenzene-2-sulfonic acid-2'-hydroxyethylamide,
4-amino-4'-hydroxy-3-methyl-1,1'-diphenylether,
1-amino-3- or -4-hydroxybenzene,
1-amino-2,5-dimethylbenzene,
1-amino-2,4-dimethylbenzene,
1-amino-3,4-dichlorobenzene,
2-acetylamino-4-amino-1-methylbenzene,
4-aminoacetanilide,
3-aminoacetanilide,
2-aminobenzene-1-sulfonic acid-N-ethyl-N-phenylamide,
1-aminobenzene-3-sulfonic acid amide,
1-aminobenzene-4-sulfonic acid dimethylamide,
1-aminobenzene-3-sulfonic acid phenylamide,
1-amino-4-benzoylaminobenzene,
1-amino-4-butylbenzene,
1-amino-2-chlorobenzene-4-sulfonic acid methylamide,
1-aminonaphthalene,
2-aminonaphthalene,
1-aminobenzene-2-, -3- or -4-sulfonic acid,
1-amino-2,5-dichlorobenzene-4-sulfonic acid,
1-amino-3-chloro-4-methylbenzene-6-sulfonic acid,
2-amino-1-methylbenzene-4-sulfonic acid,
4-amino-1-methylbenzene-5-sulfonic acid,
4-amino-1,3-dimethylbenzene-5-sulfonic acid,
1-amino-2-chlorobenzene-4-sulfonic acid,
1-amino-2-chlorobenzene-5-sulfonic acid,
2-aminonaphthalene-1-sulfonic acid,
2-aminonaphthalene-5-sulfonic acid.

With these dyes dyeings of yellow, golden yellow or orange shade are obtained on the aforenamed substrates.

EXAMPLE 2

22.3 parts of 2-aminonaphthalene-1-sulfonic acid are diazotized in the normal way with a sodium nitrite solution and the diazo compound is coupled with 33 parts of 1-phenyl-3-methyl-5-para-toluenesulfonamidopyrazole in solution in 150 parts of methanol and 50 parts of water, at a temperature of 5-8°. Subsequently the pH of the solution is adjusted to 7 and the dye, which settles out, is filtered off with suction, washed and dried at 100°. This dye gives bright, level orange dyeings of good light and wet fastness on natural or synthetic polyamide fibres.

The 33 parts of 1-phenyl-3-methyl-5-para-toluenesulfonamidopyrazole employed in Example 2 can be replaced by the equivalent amount of one of the coupling components listed in the following table and the reaction effected as given in Example 1 using the diazo components there named. The dyes thus obtained show similar yellow, golden yellow or orange shades and have the same good fastness properties.

The symbols R, $R_1$, $R_2$ and $R_3$ in the formula

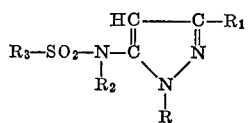

have the meanings given them in the table.

| Example No. | R | R₁ | R₂ | R₃ |
|---|---|---|---|---|
| 3 | H | H | H | 4-CH₃-C₆H₄- |
| 4 | H | —CH₃ | H | Same as above; |
| 5 | H | —C₆H₅ | H | Do: |
| 6 | H | —C₆H₄-CH₃ | H | Do |
| 7 | H | —C₆H₄-NO₂ | H | Do: |
| 8 | H | —CH₂COOH | H | Do. |
| 9 | —CH₃ | —CH₃COOH | H | Do. |
| 10 | —CH₃ | —CH₂CN | H | Do. |
| 11 | CH₃—CO— | —C₆H₅ | H | Do: |
| 12 | Same as above | 4-CH₃-C₆H₄- | H | Do. |
| 13 | NH₂—CO— | —C₆H₅ | H | Do. |
| 14 | NH₂—CO— | —C₆H₄-CH₃ | H | Do. |
| 15 | NH₂—CO— | —C₆H₄-NO₂ | H | Do. |
| 16 | C₆H₅—NH—CO— | 4-CH₃-C₆H₄- | H | Do. |
| 17 | —C₆H₅ | —CH₃ | H | Do. |
| 18 | Same as above | —C₆H₅ | H | Do: |
| 19 | do | H | H | Do. |
| 20 | do | —C₆H₄-CH₃ | H | Do: |
| 21 | do | —C₆H₄-OCH₃ | H | Do: |
| 22 | do | —C₆H₄-NH₂ | H | Do: |
| 23 | do | 2-Cl-C₆H₄- | H | Do. |
| 24 | do | 3-Cl-C₆H₄- | H | Do. |
| 25 | do | 4-Cl-C₆H₄- | H | Do. |
| 26 | do | —C₆H₄-NO₂ | H | Do: |
| 27 | do | —C₆H₄-O-CH₃ | H | Do: |
| 28 | do | —C₆H₄-COO— | H | Do. |
| 29 | do | —COOH | H | Do: |
| 30 | do | —COOC₂H₅ | H | Do. |
| 30 | do | —COOC₂H₅ | H | Do. |
| 31 | do | —CH₂COOH | H | Do. |
| 32 | 2-CH₃-C₆H₄- | —CH₃ | H | Do. |

TABLE—Continued

| Example No. | R | $R_1$ | $R_2$ | $R_3$ |
|---|---|---|---|---|
| 33 | 4-CH₃-C₆H₄- | —CH₃ | H | Do. |
| 34 | 2-Cl-C₆H₄- | —CH₃ | H | Do. |
| 35 | 4-O₂N-C₆H₄- | —CH₃ | H | Do. |
| 36 | 4-H₂N-SO₂-C₆H₄- | —CH₃ | H | Do. |
| 37 | 2,4-Cl₂-(Cl)-C₆H₂- (2,3,4-trichlorophenyl) | —CH₃ | H | Do. |
| 38 | 2,4-(O₂N)₂-C₆H₃- | —CH₃ | H | Do. |
| 39 | 2,4-(O₂N)₂-3-NO₂-C₆H₂- | —CH₂—C₆H₄—Br | H | Do. |
| 40 | Same as above | C₆H₅— | H | Do. |
| 41 | H | H | —SO₂—C₆H₄—NH₂ | Do. |
| 42 | H | —CH₃ | Same as above | Do. |
| 43 | C₆H₅— | CH₃ | do | Do. |
| 44 | Same as above | —OCH₃ | do | Do. |
| 45 | 2-Cl-C₆H₄- | —CH₃ | H | Do. |
| 46 | 4-Cl-C₆H₄- | —CH₃ | H | Do. |
| 47 | 4-H₃CO-C₆H₄- | —CH₃ | H | Do. |
| 48 | C₆H₅— | —CH₃ | H | —CH₃ |
| 49 | 3-H₃C-C₆H₄- | —CH₃ | H | C₆H₅— |
| 50 | C₆H₅— | —CH₃ | —CH₃ | 4-H₃C-C₆H₄- |
| 51 | Same as above | —CH₃ | C₆H₅— | Same as above. |
| 52 | 2,5-Cl₂-4-SO₃H-C₆H₂- | —CH₃ | H | Do. |
| 53 | C₆H₅— | —CH₃ | H | —CH₃ |
| 54 | Same as above | —CH₃ | H | —C₂H₅ |
| 55 | 4-Br-C₆H₄- | —CH₃ | H | 4-CH₃-C₆H₄- |

TABLE—Continued

| Example No. | R | R₁ | R₂ | R₃ |
|---|---|---|---|---|
| 56 | Br-⌬- | —CH₃ | H | Same as above. |
| 57 | F-⌬-F | —CH₃ | H | Do. |

The 1 - para - sulfophenyl-3-methyl-5-paratoluenesulfonylaminopyrazole can be prepared as follows. 255 parts of paratoluenesulfonic acid acetoacetamide are dissolved in 750 parts of 50% sulfuric acid and over 15 minutes 110 parts of para-sulfophenylhydrazine are added to the solution, on which an exothermic reaction is initiated. The temperature is held at 20–25° by external cooling. After 3 hours the reaction mixture is discharged onto 2000 parts of ice, which causes the 1-para-sulfophenyl-3-methyl - 5 - para-toluenesulfonylaminopyrazole to separate out in a filterable form. The precipitate is isolated by filtration, washed until of neutral reaction and dried at 100° C.

DYEING EXAMPLE

A dyebath is prepared with 4000 parts of water, 10 parts of anhydrous sodium sulfate and 2 parts of the dye of Example 1. At 40° 100 parts of wetted wool fabric are entered and the bath is then raised to the boil in 30 minutes. Dyeing is continued for 1 hour at the boil, then 4 parts of glacial acetic acid are added and the fabric dyed to shade in a further 30 minutes at the boil. During dyeing the water lost by evaporation is continuously replaced. On removal from the bath the fabric is rinsed with water and dried. Synthetic polyamide fibres, e.g. nylon 66, can be dyed by the same method. The dyeings have good light and wet fastness properties.

The following dyes can be produced by the procedure given in Example 1.

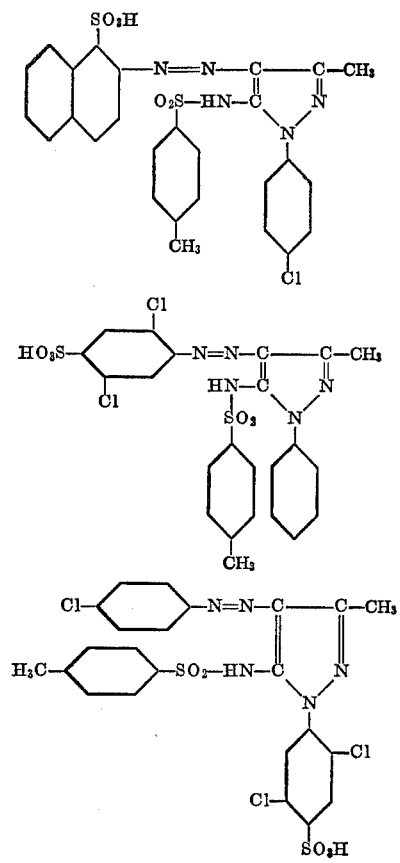

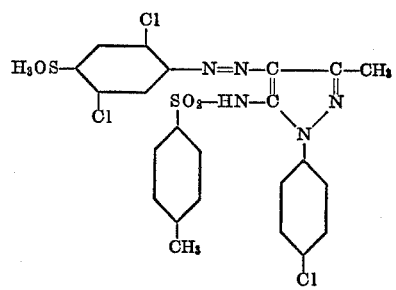

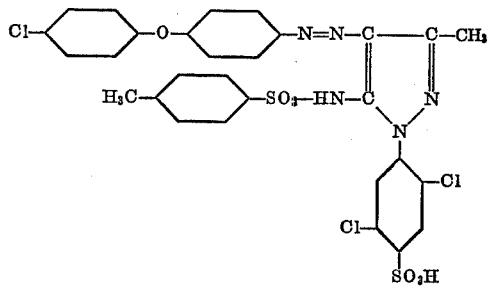

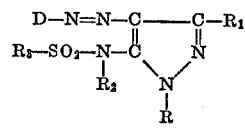

What is claimed is:
1. A compound of the formula

$$D-N=N-C-C-R_1$$
$$R_3-SO_2-N-C$$
$$R_2 \quad N$$
$$R$$

wherein
D is phenyl, substituted phenyl, naphthyl or substituted naphthyl, wherein each substituent of substituted phenyl and substituted naphthyl is independently halo, lower alkyl, phenoxy, substituted phenoxy wherein each substituent is independently chloro, hydroxy or cyclohexyl, nitro, cyclohexyl, lower alkylphenylsulfonyl, sulfamoyl, lower alkylsulfamoyl, lower hydroxyalkylsulfamoyl, phenylsulfamoyl, di-lower alkylsulfamoyl, N-lower alkyl-N-phenylsulfamoyl, lower alkylcarbonylamino, benzamido, sulfo, phenylazo, diphenylazo or naphthylazo,
R is hydrogen, lower alkyl, substituted lower alkyl wherein each substituent is independently halo, hydroxy, cyano or phenyl, phenyl, substituted phenyl, naphthyl, substituted naphthyl, cycloalkyl of 4 to 7 carbon atoms, substituted cycloalkyl wherein each substituent is independently halo, hydroxy, cyano, phenyl or lower alkyl and the cycloalkyl ring has 4 to 7 carbon atoms or acyl,
$R_1$ is hydrogen, carboxy, benzoyloxy, —CONR₅R₆, —CO₂R₇, lower alkyl, substituted lower alkyl wherein each substituent is independently lower alkoxy, halo, nitro, cyano, amino, carboxy or halophenyl, cycloalkyl of 4 to 7 carbon atoms, substituted cycloalkyl wherein each substituent is independently lower alkyl, lower alkoxy, halo, nitro, cyano, amino, carboxy, phenyl or halophenyl and the cycloalkyl ring of substituted cycloalkyl has 4 to 7 carbon atoms, lower alkoxy, phenyl, naphthyl, substituted phenyl or substituted naphthyl, wherein each substituent of substituted phenyl and substituted naphthyl is independently lower alkyl, lower alkoxy, halo, nitro, cyano, amino, carboxy, phenyl or halophenyl, $R_2$ is hydrogen, lower alkyl, substituted lower alkyl wherein each substituent is independently halo, hydroxy, cyano or phenyl, cycloalkyl of 4 to 7 carbon atoms, substituted cycloalkyl wherein each substituent is independently halo, hydroxy, cyano, phenyl or lower alkyl and the cycloalkyl ring of substituted cycloalkyl has 4 to 7 carbon atoms, phenyl, substituted phenyl, naphthyl, substituted naphthyl or acyl, each of $R_3$ and $R_7$ is independently lower alkyl, substituted lower alkyl wherein each substituent is independently halo, hydroxy, cyano or phenyl, cycloalkyl of 4 to 7 carbon atoms, substituted cycloalkyl wherein each substituent is independently halo, hydroxy, cyano, phenyl or lower alkyl and the cycloalkyl ring has 4 to 7 carbon atoms, phenyl, naphthyl, substituted phenyl or substituted naphthyl, wherein each substituent of substituted phenyl and substituted naphthyl is independently halo, hydroxy, cyano, phenyl, or lower alkyl, and each of $R_5$ and $R_6$ is independently hydrogen or $R_3$, wherein in each of R and $R_2$ each substituent of substituted phenyl and substituted naphthyl is independently halo, cyano, nitro, hydroxy, lower alkyl, substituted lower alkyl wherein each substituent of substituted lower alkyl is independently halo, hydroxy, cyano or phenyl, cycloalkyl of 4 to 7 carbon atoms, phenyl, naphthyl, lower alkoxy, phenoxy, naphthyloxy, lower carboxyalkyl, acylamino, sulfamoyl, lower alkylsulfonyl, substituted lower alkylsulfonyl wherein each substituent is independently halo, hydroxy, cyano or phenyl, phenylsulfonyl, lower alkoxycarbonyl, phenoxycarbonyl, lower alkoxysulfonyl, phenoxysulfonyl, carbamoyl or sulfo, and each acyl and acyl radical of acylamino is independently $R_{10}$—$X_1$— or $R_5$—$X_2$—, wherein
$R_{10}$ is hydroxy or $R_3$,
$X_1$ is

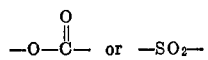

$X_2$ is

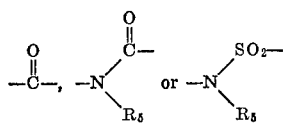

and
$R_3$ and $R_5$ are as defined above,
with the proviso that the molecule contains 1 or 2 sulfo groups.

2. A compound according to claim 1 having the formula

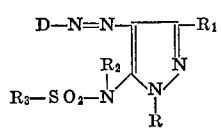

wherein
D is phenyl, substituted phenyl, naphthyl or substituted naphthyl, wherein each substituent of substituted phenyl and substituted naphthyl is independently halo, lower alkyl, phenoxy, substituted phenoxy wherein each substituent is independently chloro, hydroxy or cyclohexyl, nitro, lower alkylphenylsulfonyl, sulfamoyl, lower alkylsulfamoyl, lower hydroxyalkylsulfamoyl, phenylsulfamoyl, dilower alkylsulfamoyl, N-lower alkyl - N - phenylsulfamoyl, lower alkylcarbonylamino, benzamido or sulfo, R is hydrogen, lower alkyl, phenyl, substituted phenyl wherein each substituent is independently lower alkyl, halo, nitro, sulfamoyl, lower alkoxy or sulfo, carbamoyl, phenylcarbamoyl or lower alkylcarbonyl, $R_1$ is hydrogen, lower alkyl, substituted lower alkyl wherein each substituent is independently cyano, carboxy or halophenyl, lower alkoxy, phenyl, substituted phenyl wherein each substituent is independently lower alkyl, lower alkoxy, nitro, amino or halo, benzoyloxy, carboxy or lower alkoxycarbonyl, $R_2$ is hydrogen, lower alkyl, phenyl or p-aminophenylsulfonyl, and $R_3$ is lower alkyl, phenyl or lower alkylphenyl.

3. A compound according to claim 2 wherein
D is phenyl, substituted phenyl, naphthyl or substituted naphthyl, wherein each substituent of substituted phenyl and substituted naphthyl is independently chloro, sulfo, phenoxy or substituted phenoxy wherein the substituent of substituted phenoxy is chloro or cyclohexyl, R is phenyl or substituted phenyl wherein each substituent is independently lower alkyl, halo, nitro, sulfamoyl, lower alkoxy or sulfo,
$R_1$ is lower alkyl,
$R_2$ is hydrogen, and
$R_3$ is phenyl or lower alkylphenyl.

4. A compound according to claim 3 wherein
D is sulfonaphthyl or substituted phenyl wherein each substituent is independently chloro, sulfo or chlorophenoxy,
R is phenyl or substituted phenyl wherein each substituent is independently chloro or sulfo,
$R_1$ is methyl, and
$R_3$ is lower alkylphenyl.

5. A compound according to claim 4 wherein $R_3$ is p-tolyl.

6. The compound according to claim 5 having the formula

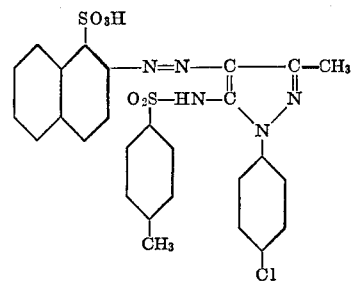

7. The compound according to claim 5 having the formula

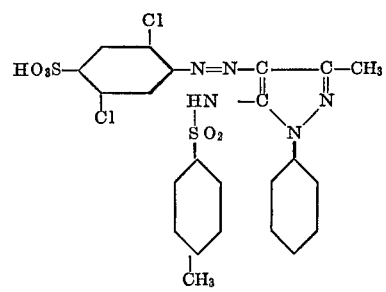

8. The compound according to claim 5 having the formula
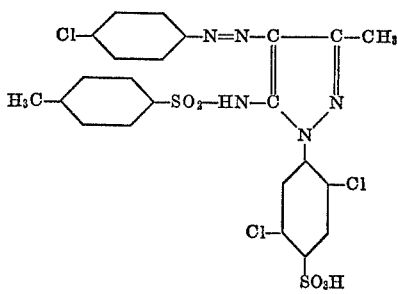
9. The compound according to claim 5 having the formula
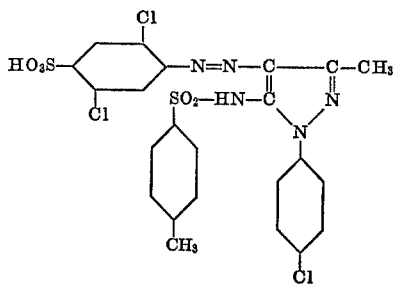
10. The compound according to claim 5 having the formula
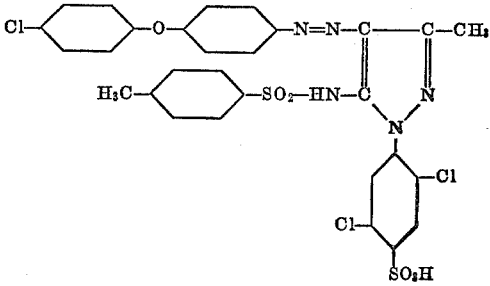
References Cited
UNITED STATES PATENTS
| | | | |
|---|---|---|---|
| 3,374,227 | 3/1968 | Schmidt et al. | 260—162 X |
| 2,243,324 | 5/1941 | Williams | 260—163 X |
| 2,435,182 | 1/1948 | Long et al. | 260—162 |
| 2,694,703 | 11/1954 | Graham | 260—163 |
| 2,991,280 | 7/1961 | Schetty et al. | 260—151 |
| 3,515,715 | 6/1970 | Straley et al. | 260—163 |
FOREIGN PATENTS
| | | | |
|---|---|---|---|
| 705,780 | 5/1941 | Germany | 260—162 |
| 353,103 | 3/1961 | Switzerland | 260—163 |
FLOYD D. HIGEL, Primary Examiner
U.S. Cl. X.R.
8—41 B; 260—160, 163, 310 R